Patented Oct. 20, 1936

2,057,948

UNITED STATES PATENT OFFICE 2,057,948

PROCESS OF PREPARING INDOLE COMPOUNDS

Ernst Herdieckerhoff, Opladen, and Eduard Tschunkur, Cologne-Mulheim, Germany, assignors to General Aniline Works, Inc., New York, N. Y., a corporation of Delaware No Drawing. Application October 28, 1932, Serial No. 640,130. In Germany October 31, 1931

8 Claims. (Cl. 260—46)

The present invention relates to a process of preparing indole compounds, more particularly it relates to compounds which may be represented by the probable general formula:

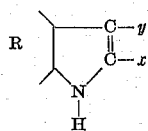

where "R" stands for an aromatic radical, such as a radical of the benzene-, naphthalene-, diphenyl- and carbazole-series, "$x$" stands for alkyl, such as methyl, ethyl, propyl, isopropyl, or for aryl, such as a radical of the benzene or naphthalene series, "$y$" stands for hydrogen or alkyl, such as methyl, ethyl, propyl, or for aryl, such as a radical of the benzene or naphthalene series, or "$x$" and "$y$" jointly stand for a tetramethylene chain, and wherein all nuclei may bear substitutents, for example, alkyl, such as methyl or ethyl, or alkoxy, such as methoxy or ethoxy, or the nitro group, the amino group, the carboxylic acid group and halogen.

It is known from literature (compare E. Fischer, Annalen der Chemie, vol. 236, page 116) that by the action of hydrazines of the benzene and naphthalene series upon aliphatic- or aliphatic-aromatic-ketones there are obtainable the corresponding hydrazones which can be isolated and which, when subjected to a zinc chloride melt at a temperature of 180–200° C., yield the corresponding indoles.

In accordance with our present invention the above specified indole compounds are prepared by heating a mineral acid- or a sulfonic acid-salt of an arylhydrazine containing a free ortho-position with respect to the hydrazine group with a ketone suitable for synthesizing indoles, i. e. a ketone containing in the vicinal position to the carbonyl group a methylene or a methyl group, in an aqueous medium in solution or in suspension.

As arylhydrazines suitable for carrying out our invention there may be mentioned by way of example hydrazines of the benzene-, naphthalene-, diphenyl- and carbazole-series, for instance, phenylhydrazine, p-methoxyphenylhydrazine, m-hydroxyphenylhydrazine, α-naphthylhydrazine, the hydrazines derived from 1-amino-8-hydroxy-naphthalene, 1-amino-4-chloronaphthalene, 3-aminocarbazole and the like. As mineral acids the salts of which are used, there may be mentioned by way of example, hydrochloric acid, sulfuric acid, phosphorus acid; it is self-understood, that acids causing by-reactions, such as nitric acid, do not come into consideration. As sulfonic acids there are mentioned benzene- and naphthalene-sulfonic acids, such as naphthalene-1.5-disulfonic acid.

Instead of starting with a salt of the arylhydrazine, there may be started with a free hydrazine, in which case the theoretical quantity of the acid is to be added.

When working according to both methods described it is advantageous to carry out the process in the presence of a small excess of free acid, at most ½ molecular proportion, calculated on the starting hydrazine, whereby in many cases the output is increased. A larger excess of free acid should be avoided, however, because the same unfavorably influences the formation of the hydrazone which intermediarily forms, whereby the yield of indole compound would be decreased.

As ketones suitable for our process there are mentioned, by way of example, cyclohexanone, dialkylketones, such as methylethylketone, diethylketone, acetone, further arylalkylketones, such as acetophenone, and aralkyl-arylketones, such as benzylphenylketone.

The temperatures required for performing our process depend somewhat upon the specific ketone used. As a general rule, however, there may be stated that temperatures between about 80 and about 160° C. are suitable. All those ketones containing at least one methylene group in vicinal position to the carbonyl group, such as methylethylketone, cyclohexanone, diethylketone, generally condense to form the corresponding indole already at temperatures below 100° C.; phenylbenzylketones in this series, however, advantageously being condensed at temperatures between 120 and 140° C., while ketones containing a methyl group vicinal to the carbonyl group generally condense at higher temperatures, for instance, acetone at about 120° C., and acetophenone at about 150° C.

The condensation is complete generally in about 1 to 2 hours. In some cases the process is favorably carried out with the addition of an indifferent solvent for the hydrazine, for example, alcohol or acetic acid.

As mentioned above there is intermediarily formed from the hydrazine and the ketone the corresponding hydrazone, and the whole process probably proceeds according to the following scheme:

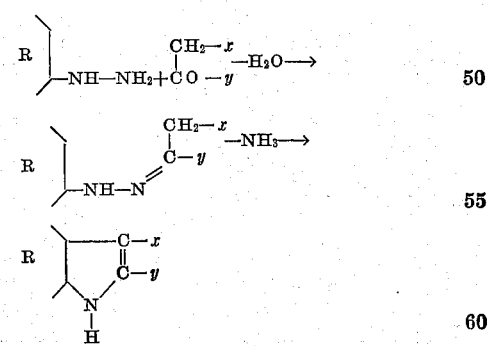

wherein the letters "R", "x" and "y" are to be defined as above.

As the two components react upon each other in molecular proportions, it is self-understood that the process is favorably started with about the theoretical quantities of the reacting substances, or also with a small excess, say a few percent, of one of the components. We wish it to be understood, however, that the process may be carried out with other proportions, without departing from the spirit of our invention.

The indoles prepared according to our new process are generally yellowish substances, insoluble in water, soluble in organic solvents and are valuable intermediate products for the manufacture of dyestuffs.

The invention is illustrated by the following examples, without being limited thereto:

*Example 1.*—85 kgs. of p-methoxyphenylhydrazine hydrochloride are suspended with 36 kgs. of methylethylketone in 700 l. of a 10% aqueous acetic acid and with the addition of 20 kgs. of zinc chloride and heated with stirring for about 2 hours at about 95° C. The isolation of the 2.3-dimethyl-5-methoxyindole of the formula:

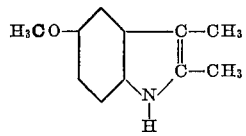

is performed by steam distillation, in which process at first the excess ketone distills and then the indole is formed. Or the indole formed can be isolated by extracting with a solvent, such as benzene, distilling off the solvent and fractionating the remainder in vacuo. The new indole compound has the melting point of 114–115° C. The output amounts to above 90% of theory.

*Example 2.*—100 kgs. of α-naphthylhydrazine hydrochloride are heated in an autoclave, while stirring, at about 120° C. for about 2 hours with 32 kgs. of acetone in 1000 l. of a 10% aqueous acetic acid and with the addition of 30 l. of a 30% aqueous hydrochloric acid. When the reaction is complete, the excess acetone is distilled off with steam and the crude 2-methylnaphthindole of the formula:

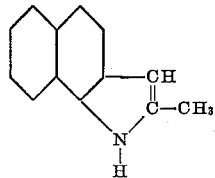

is extracted with benzene and purified by distillation. It has the melting point of 132° C.

*Example 3.*—60 kgs. of phenylhydrazine hydrochloride and 50 kgs. of acetophenone are heated in 600 l. of water with the addition of 25 l. of a 22% aqueous hydrochloric acid for about 2-3 hours at 160° C. in an autoclave, while stirring. The isolation and purification of the 2-phenylindole formed are performed as described in Example 2; it has the melting point of 185° C.

*Example 4.*—50 kgs. of m-hydroxyphenylhydrazine and 41 kgs. of cyclohexanone are heated in 500 l. of water with the addition of 90 kgs. of naphthalene-1.5-disulfonic acid for about 1 hour at 90–95° C. with stirring. The 1.2.3,4-tetrahydro-7-hydroxycarbazole of the following formula:

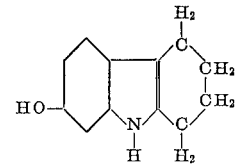

having a melting point of 164° C. is obtained in a rather quantitative yield.

*Example 5.*—100 kgs. of phenylhydrazine hydrochloride are heated with 136 kgs. of benzylphenylketone in 800 l. of an aqueous 85% ethylalcohol for about 2 to 3 hours at about 130° C. There is obtained in a good yield the 2.3-diphenylindole of the melting point 122–123° C.

In an analogous manner as described in Example 1 there is obtained from the hydrochloride of diphenyl-4-hydrazine and methylethylketone 2.3-dimethyl-5-phenylindole of the formula:

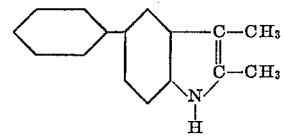

*Example 6.*—180 kgs. of the hydrochloride of 4-phenylhydrazine carboxylic acid are suspended in 600 l. of a 10% aqueous acetic acid and thereto are slowly added 72 kgs. of methylethylketone, while heating to 95° C. When all the ketone has been introduced, the temperature is kept at 95° C. for about 2 hours. The excess methylethylketone is driven off by steam distillation, the solution is rendered weakly alkaline by the addition of aqueous caustic soda, and the sodium salt of the 2.3-dimethylindole-5-carboxylic acid is salted out with common salt. The yield is nearly quantitative.

In an analogous manner there can be prepared indoles from hydrazine compounds of heterocyclic ring systems of aromatic character, for example, by heating the hydrochloride of 2-hydrazino-carbazole with diethylketone in dilute aqueous acetic acid at a temperature of 95° C., there is obtained an indole of the following formula:

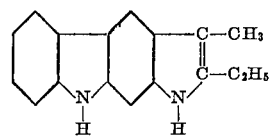

By the expression "slightly acid" in the appended claims we mean that the preferred upper limit of free acid in the medium is about ½ molecular proportion, calculated on the starting hydrazine; but that larger amounts of free acid may be employed with corresponding decreases in the yield of the desired product.

We claim:
1. The process of preparing indole compounds which comprises heating in an aqueous neutral to slightly acid medium for about one to about two hours at a temperature between about 80° and about 160° C. a compound of the group consisting of aliphatic-, aliphatic-araliphatic-, aliphatic-aromatic and araliphatic-aromatic-ketones and a salt of an aromatic hydrazine having a free o-position with respect to the hydrazine group with an acid of the group consisting of mineral acids causing no side-reactions in the reaction mixture and sulfonic acids.

2. The process as claimed in claim 1, in which the process is carried out with the addition of at most ½ molecular quantity, calculated on the starting aromatic hydrazine salt, of a compound of the group consisting of free mineral acids causing no side-reaction in the reaction mixture and sulfonic acids.

3. The process as claimed in claim 1, in which the process is carried out in the presence of an inert solvent.

4. The process as claimed in claim 1, in which the process is carried out with the addition of at most ½ molecular quantity, calculated on the starting aromatic hydrazine salt, of a compound of the group consisting of free mineral acids causing no side-reaction in the reaction mixture and sulfonic acids in the presence of an inert solvent.

5. The process as claimed in claim 1, in which the process is carried out in the presence of a compound of the group consisting of ethylalcohol and acetic acid as solvent.

6. The process as claimed in claim 1, in which acetophenone is used as ketone.

7. The process as claimed in claim 1, in which methylethylketone is used as ketone.

8. The process as claimed in claim 1, in which acetone is used as ketone.

ERNST HERDIECKERHOFF.
EDUARD TSCHUNKUR.